(12) United States Patent
Wood et al.

(10) Patent No.: US 12,471,532 B2
(45) Date of Patent: Nov. 18, 2025

(54) WORK MACHINE

(71) Applicant: KUBOTA CORPORATION, Osaka (JP)

(72) Inventors: Isaac Wood, Jefferson, GA (US); Yuta Horibe, Duluth, GA (US); Min Sung Kim, Buford, GA (US)

(73) Assignee: KUBOTA CORPORATION, Osaka (JP)

(*) Notice: Subject to any disclaimer, the term of this patent is extended or adjusted under 35 U.S.C. 154(b) by 725 days.

(21) Appl. No.: 17/874,943

(22) Filed: Jul. 27, 2022

(65) Prior Publication Data

US 2024/0032473 A1    Feb. 1, 2024

(51) Int. Cl.
*A01D 75/00* (2006.01)
*B60P 3/06* (2006.01)

(52) U.S. Cl.
CPC ............ *A01D 75/006* (2013.01); *B60P 3/066* (2013.01)

(58) Field of Classification Search
CPC .......... B60R 11/00; B60R 9/048; B60R 9/00; B60R 9/06; B60P 7/0807; A01D 75/006
USPC ........................................................ 180/311
See application file for complete search history.

(56) References Cited

U.S. PATENT DOCUMENTS

| | | | | |
|---|---|---|---|---|
| 3,038,740 A * | 6/1962 | Blunden | ............... | B61D 45/008 410/12 |
| 3,473,487 A * | 10/1969 | Blunden | ................. | B60P 3/073 410/12 |
| 3,685,856 A * | 8/1972 | Blunden | ................. | B60P 3/073 410/12 |
| 3,722,911 A * | 3/1973 | Rhody | ...................... | B60R 9/00 410/108 |
| 3,814,461 A * | 6/1974 | Rhody | ................... | B60R 9/048 410/108 |
| 4,193,349 A * | 3/1980 | Allen | ...................... | B60P 3/073 24/DIG. 35 |
| 5,215,425 A * | 6/1993 | Hambright | .............. | E02F 9/003 280/402 |
| 6,783,312 B2 * | 8/2004 | Smith | ................... | B60P 7/0823 410/97 |
| 7,740,254 B2 * | 6/2010 | Takemura | ............... | E02F 9/125 280/124.111 |
| 9,596,804 B2 * | 3/2017 | Asahara | .................... | B60K 1/00 |
| 10,875,461 B2 * | 12/2020 | Salter | ...................... | F21V 33/00 |
| 11,285,860 B2 * | 3/2022 | Beilman | ................... | B60R 9/00 |

(Continued)

FOREIGN PATENT DOCUMENTS

JP        2016-124427 A      7/2016

*Primary Examiner* — Paul N Dickson
*Assistant Examiner* — Caitlin Anne Miller
(74) *Attorney, Agent, or Firm* — GREENBLUM & BERNSTEIN, P.L.C.

(57) ABSTRACT

A work machine includes: a body including: a body frame; a driver's seat at a central portion of the body; a power source at a back portion of the body; and a front-wheel unit disposed at a front portion of the body and extending in a left-right direction of the body, wherein the body has a forward portion provided with at least one first holder configured to hold a rope and/or allowing the rope to pass therethrough. The forward portion is provided with two or more first holders which are each usable as an independent holder or which are usable in conjunction with each other to allow a rope to pass through both holders.

15 Claims, 12 Drawing Sheets

(56) References Cited

U.S. PATENT DOCUMENTS

2021/0404225 A1* 12/2021 Tanaka .................. B62D 49/00
2024/0059209 A1*  2/2024 Bennett .................... B60R 9/00

* cited by examiner

WORK MACHINE

TECHNICAL FIELD

The present invention relates to a work machine including a body, a power source at a back portion of the body, and a front-wheel unit at a front portion of the body.

BACKGROUND ART

A known work machine such as the above is the work machine disclosed in JP 2016-124427 A. The work machine includes a body, an engine at a back portion of the body, a driver's seat at the center of the body, and a front-wheel unit at a front portion of the body.

Work machines may be transported on the carrier box of a track or a trailer (hereinafter referred to as "carrier box or the like") if, for instance, the storage place and the work place are far from each other. Work machines are, in that case, desirably fixed to the carrier box or the like with use of ropes.

SUMMARY OF THE INVENTION

JP 2016-124427 A does not disclose its work machine as including a portion that allows the work machine to be fixed to a carrier box or the like with use of ropes. Such a work machine will be fixed to a carrier box or the like by, for instance, winding ropes around such portions as the front-wheel unit itself and a step forward of the driver's seat. It is, however, not easy to determine, for any of various work machines, appropriate portions of the work machine to wind ropes around to secure the work machine to a carrier box or the like. The work machine may thus fail to be secured to a carrier box or the like.

The above circumstances have led to a demand for a work machine easily fixable to a carrier box.

A work machine according to the present invention includes: a body including: a body frame; a driver's seat at a central portion of the body; a power source at a back portion of the body; and a front-wheel unit disposed at a front portion of the body and extending in a left-right direction of the body, wherein the body has a forward portion provided with at least one first holder configured to hold a rope and/or allowing the rope to pass therethrough.

With the above characteristic configuration, the body has a forward portion provided with at least one first holder configured to hold a rope and/or allowing the rope to pass therethrough. Fastening a rope to and/or passing the rope through the first holder helps fix the work machine to a carrier box or the like. The first holder, disposed at a forward portion of the body, allows a person to easily and rapidly determine where to appropriately fasten a rope and/or pass the rope on the work machine. This in turn allows a person to reliably fix the work machine to a carrier box or the like.

The work machine may be further arranged such that the front-wheel unit includes: a left front wheel; a right front wheel; and a support frame supporting the front wheels, wherein the at least one first holder is on a top face of the support frame.

The above configuration allows the work machine to be designed for facilitated placement of the first holder.

The work machine may be further arranged such that the at least one first holder is in a U shape.

The above configuration easily prevents a rope from being detached from the first holder.

The work machine may be further arranged such that the at least one first holder includes two first holders disposed at respective left and right portions of the body and to respective opposite lateral sides of the driver's seat in a front view.

With the above configuration, the first holders are less likely to obstruct the driver's view.

The work machine may further include: a left front wheel at the front portion of the body; and a right front wheel at the front portion of the body, wherein the first holders are within a first width in a front view, the first width being a dimension extending in the left-right direction of the body and defined by respective sides of the front wheels which sides face the center of the body.

The above configuration allows a rope to be fastened to each first holder of the work machine with a reduced load on its front wheels.

The work machine may further include: a left rear wheel at the back portion of the body; and a right rear wheel at the back portion of the body, wherein the first holders are within a second width in a front view, the second width being a dimension extending in the left-right direction of the body and defined by the rear wheels.

With the above configuration, fastening a rope to and/or passing the rope through each first holder allows a front-side portion of the work machine to be fixed stably.

The work machine may be further arranged such that the at least one first holder is below a seat surface of the driver's seat.

The above configuration allows a rope to be fastened to a portion of the work machine which portion (that is, the first holder) is lower in position than the driver's seat, and thereby allows the work machine to be fixed stably.

The work machine may further include: a left rear wheel at the back portion of the body; and a right rear wheel at the back portion of the body, wherein the at least one first holder has an upper end below respective upper ends of the rear wheels.

The above configuration allows a rope to be fastened to and/or pass through a portion of the work machine which portion (that is, the first holder) is lower in position than the respective upper ends of the rear wheels, and thereby allows the work machine to be fixed stably.

The work machine may be further arranged such that the at least one first holder is at a height close to a center of gravity of the power source.

The above configuration allows a rope to be fastened to a portion of the work machine which portion (that is, the first holder) is at a height close to the center of gravity of the power source, and thereby allows the work machine to be fixed stably.

The work machine may be further arranged such that the at least one first holder is at a height close to a height of a step forward of the driver's seat in a front view.

The above configuration allows a rope to be fastened to and/or pass through a portion of the work machine which portion (that is, the first holder) is at a height close to the height of the step, and thereby allows the work machine to be fixed stably.

The work machine may be further arranged such that the at least one first holder includes two first holders disposed at respective left and right portions of the body and each having an opening axis angled relative to a front-back direction of the body.

With the above configuration, fastening a rope to each first holder allows the work machine to be fixed stably with respect to directions angled relative to the front-back direction of the body in a plan view.

The work machine may be further arranged such that the at least one first holder includes two first holders disposed at respective left and right portions of the body, the support frame includes: a linear portion fixed to the body frame; a left extension; and a right extension, the extensions extending from respective opposite ends of the linear portion, bent obliquely forward, and supporting the respective front wheels, and the at least one first holder includes a left first holder on the left extension and a right first holder on the right extension.

The above configuration allows a rope to be easily fastened to each first holder along an extension of the support frame.

The work machine may be further arranged such that the body has a backward portion provided with at least one second holder configured to hold a rope and/or allowing the rope to pass therethrough.

The above configuration allows a rope to be fastened to and/or pass through the second holder as well, that is, to a back portion of the body in addition to a front portion thereof, and thereby allows the front and back portions of the body of the work machine to be fixed stably.

The work machine may further include: a bumper extending backward relative to the body, wherein the at least one second holder includes two second holders disposed at respective left and right portions of the body and forward of and to respective opposite lateral sides of the bumper.

With the above configuration, the second holders do not protrude from the bumper, so that the second holders are less likely to come into contact with an external object. Further, with the second holders apart from each other by a distance larger than the width of the bumper, fastening a rope to and/or passing the rope through each second holder allows a back portion of the body of the work machine to be fixed stably.

The work machine may be further arranged such that the at least one first holder includes two first holders disposed at respective left and right portions of the body, and a third width is larger than a fourth width in a plan view, the third width being a dimension extending in the left-right direction of the body and defined by the first holders, the fourth width being a dimension extending in the left-right direction of the body and defined by the second holders.

If, for instance, the work machine is heavier at its front-side portion than at its back-side portion, the front-side portion is more likely to be displaced than the back-side portion while the work machine is transported on a carrier box or the like. In view of that, the above work machine is arranged such that a third width is larger than a fourth width in a plan view, the third width being a dimension extending in the left-right direction of the body and defined by the first holders, the fourth width being a dimension extending in the left-right direction of the body and defined by the second holders. The first holders thus allow the work machine to be fixed while effectively preventing the front-side portion of the work machine from being displaced.

The work machine may further include: a lock mechanism configured to restrict swing of the front-wheel unit relative to the body frame.

With the above configuration, the lock mechanism restricts swing of the front-wheel unit relative to the body frame while the work machine is being fixed to a carrier box or the like. This allows the work machine to be fixed in a stable orientation.

DETAILED DESCRIPTION OF PREFERRED EMBODIMENTS

The description below deals with a riding-type mower as an embodiment of the present invention with reference to drawings.

FIGS. 1 to 10 show "F" to indicate a forward direction, "B" to indicate a backward direction, "U" to indicate an upward direction, "D" to indicate a downward direction, "L" to indicate a leftward direction, and "R" to indicate a rightward direction.

Overall Configuration

FIGS. 1 to 5 illustrate a riding-type mower including a body 1 with a body frame 2. The riding-type mower includes a front-wheel unit 11 and a rear-wheel unit 12. The front-wheel unit 11 includes driven front wheels 11a and 11b, and is supported by the body frame 2. The rear-wheel unit 12 includes driving rear wheels 12a and 12b, and is supported by the body frame 2. The riding-type mower includes, between the front-wheel unit 11 and the rear-wheel unit 12, a mower unit 3 suspended from the body frame 2 with a link mechanism in-between. The riding-type mower includes a driver section 4 at a central portion of the body 1 in the front-back direction. The driver section 4 includes, for example, a driver's seat 41 for a driver to sit on and a pair of left and right control levers 42. The riding-type mower includes two fenders 43 respectively to the left and right of the driver section 4, a floor 44 forward of the driver section 4, and a ROPS 45 backward of the driver section 4.

Figure 1:
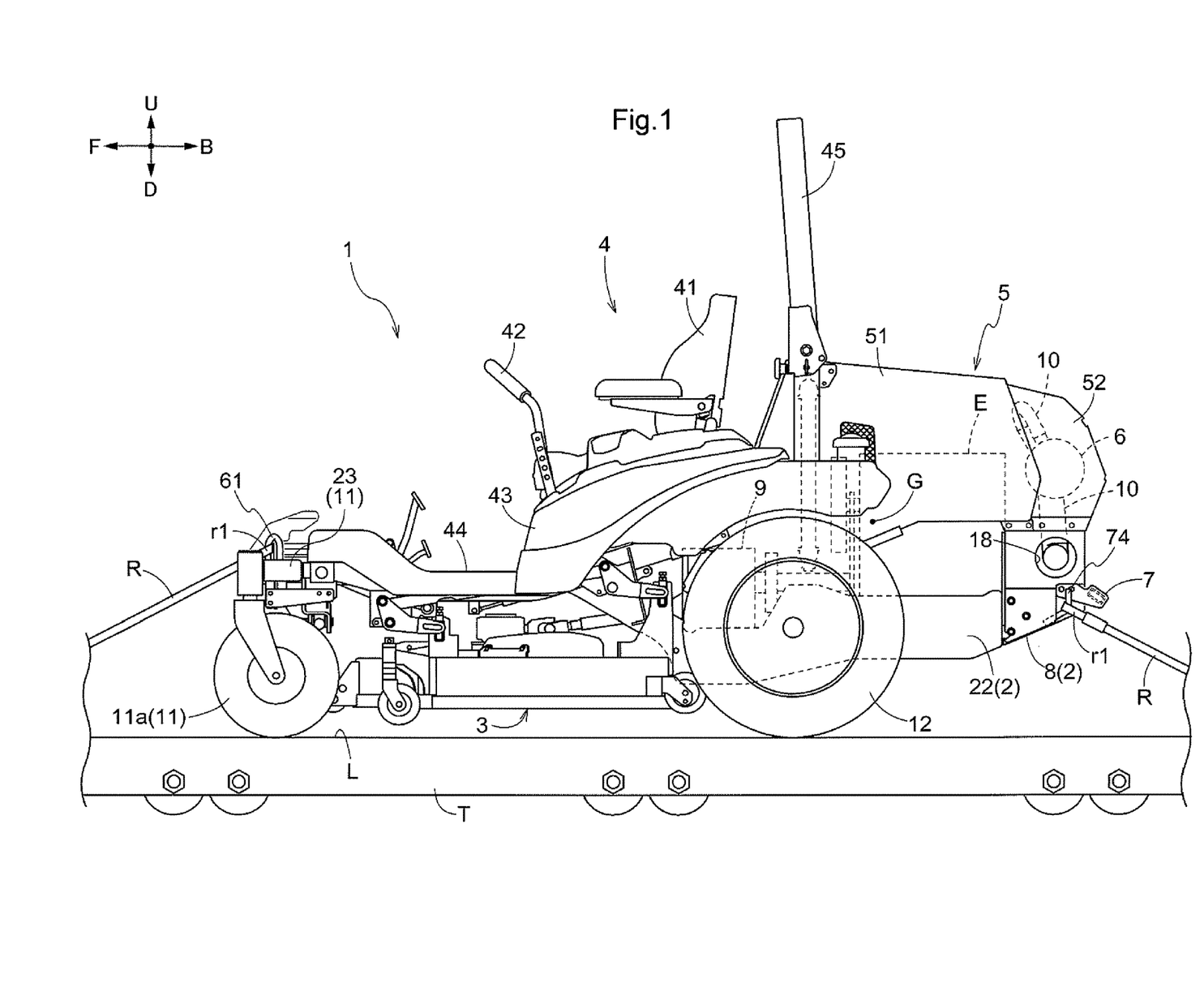
FIG. 1 is a side view of a riding-type mower as fixed to a trailer.

The riding-type mower includes, at a back portion of the body 1 (which is backward of the driver section 4), a hood 5, an exhaust gas cleaning device 6, a bumper 7, an engine E, a cooling fan 13, and an air cleaner 14. The hood 5 contains, for example, the exhaust gas cleaning device 6, the engine E, the cooling fan 13, and the air cleaner 14.

Frame Structure

Figure 4:
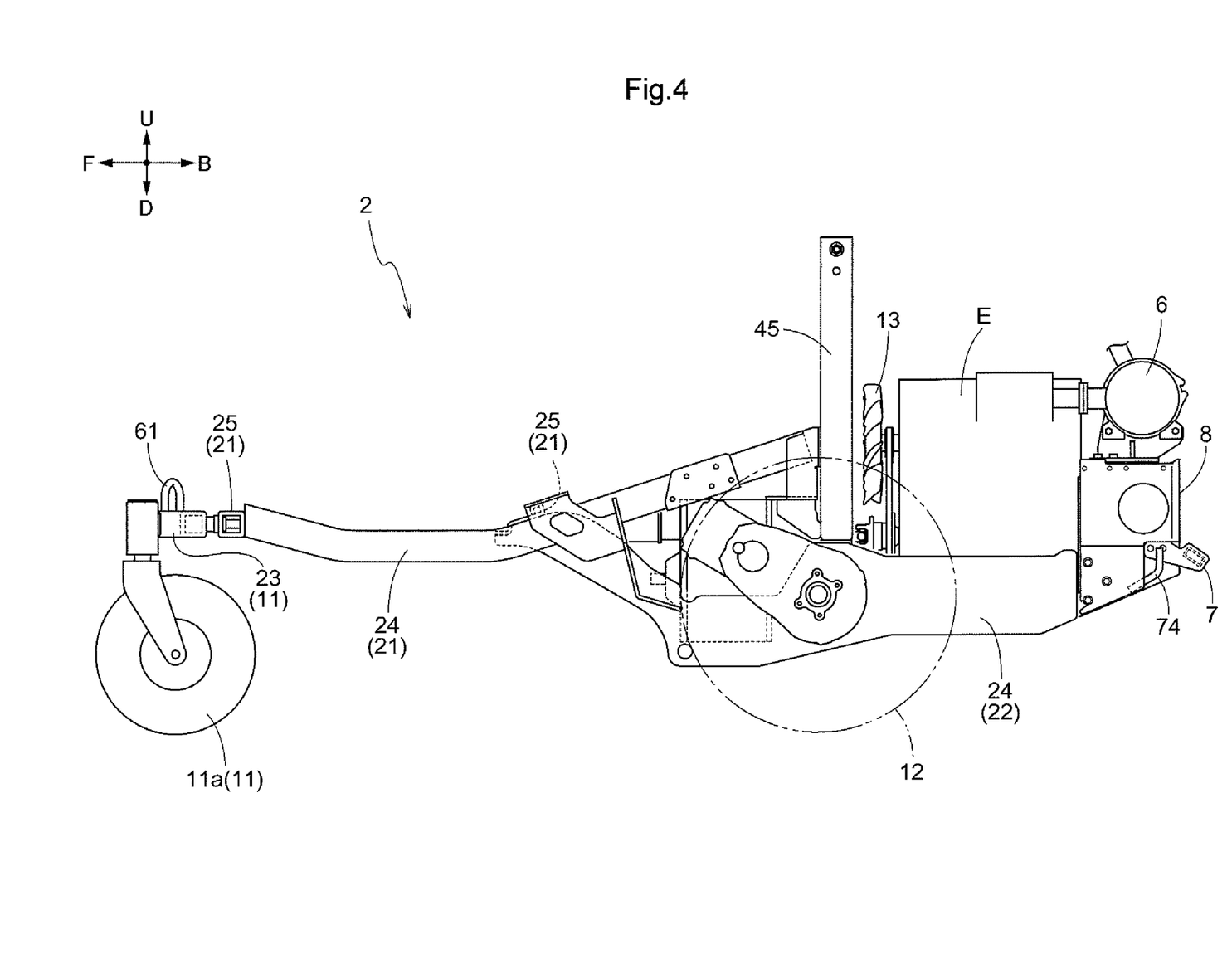
FIG. 4 is a side view of a body frame of a riding-type mower, illustrating how different parts of the body frame are positioned.
Figure 5:
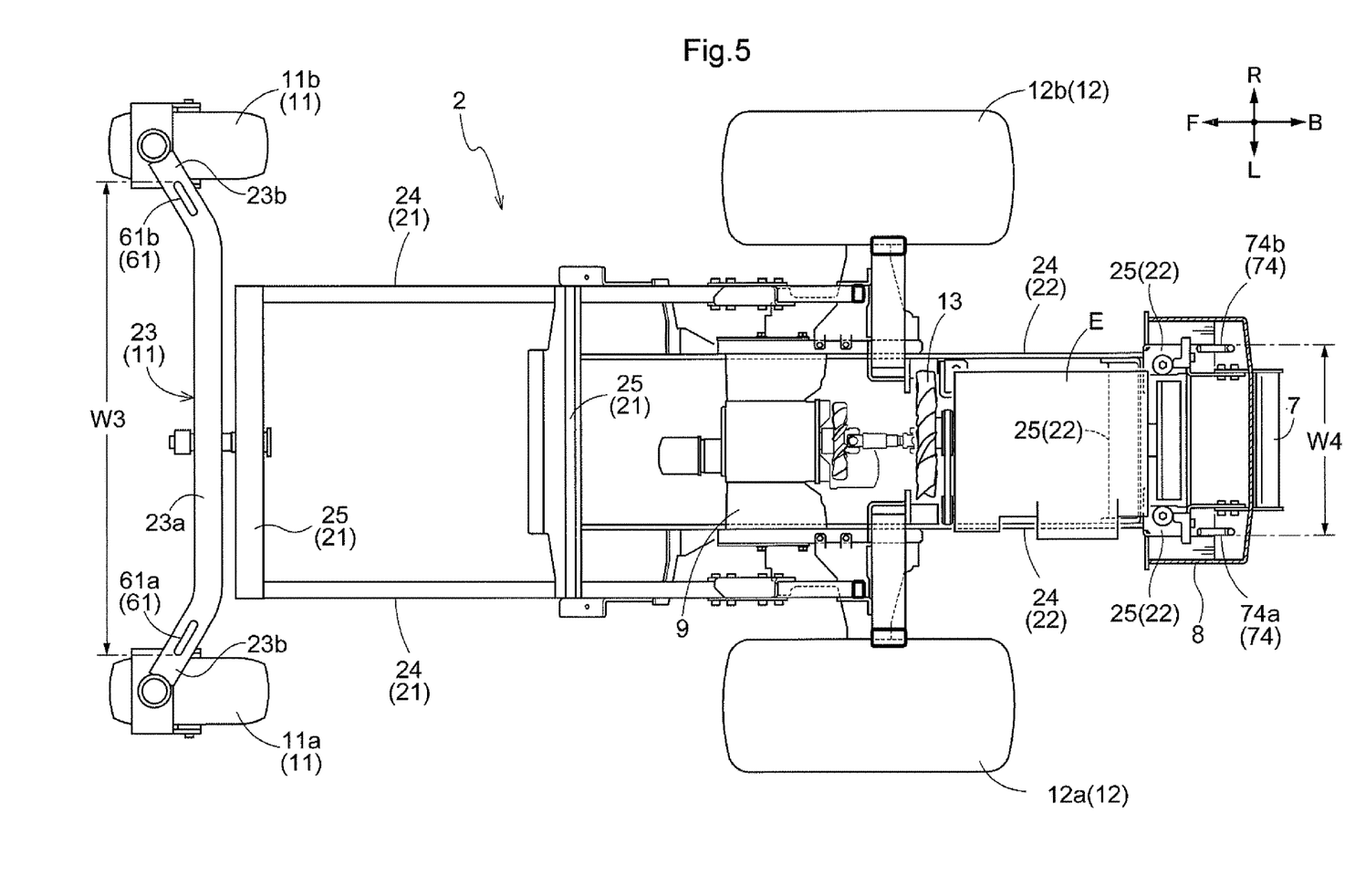
FIG. 5 is a plan view of a body frame of a riding-type mower, illustrating how different parts of the body frame are positioned.
Figure 6:
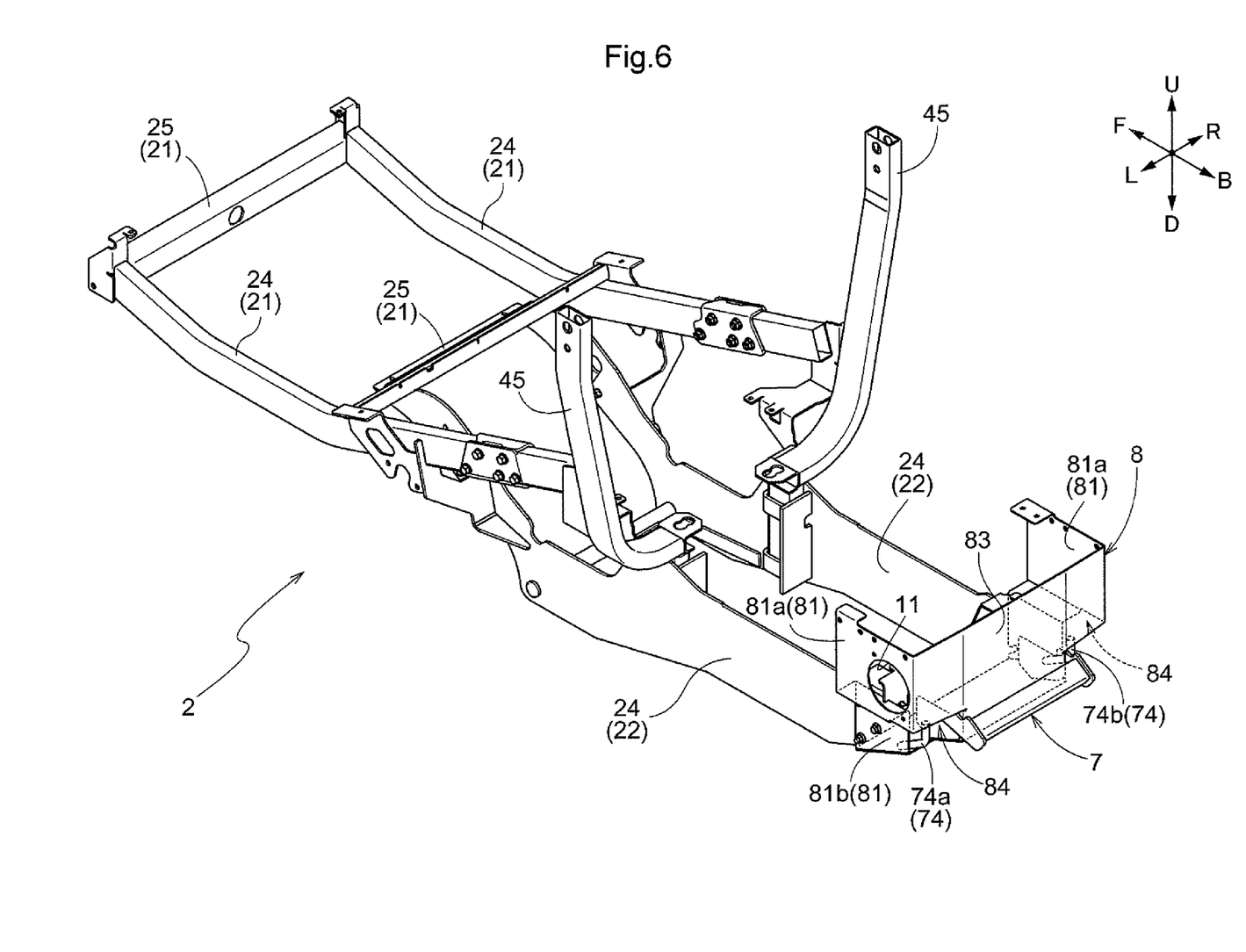
FIG. 6 is a perspective view of a body frame of a riding-type mower, illustrating how different parts of the body frame are positioned.

As illustrated in FIGS. 4, 5, and 6, the body frame 2 includes a first frame 21 positioned forward, a second frame 22 positioned backward, and a third frame 8 backward of the engine E. The first frame 21 is wider (that is, larger in the left-right direction) than the second frame 22. The first frame 21 and the second frame 22 each include a pair of left and right main frame members 24 extending in the front-back direction of the body 1 and auxiliary frame members 25 each coupling the two main frame members 24 to each other. The third frame 8 is in the shape of a box that defines a space backward of the engine E. The second frame 22 has a front portion positioned under a back portion of the first frame 21 in a plan view, and is coupled to the first frame 21 with use of a coupling member (not illustrated in the drawings). The third frame 8 is coupled to a back end portion of the second frame 22, specifically, to an auxiliary frame member 25 at a back end portion of the second frame 22. The third frame 8 overlaps with a back end portion of the second frame 22 in a plan view. The bumper 7 is detachably fixed to a back end portion of the second frame 22.

Engine and Other Devices Therearound

Figure 7:
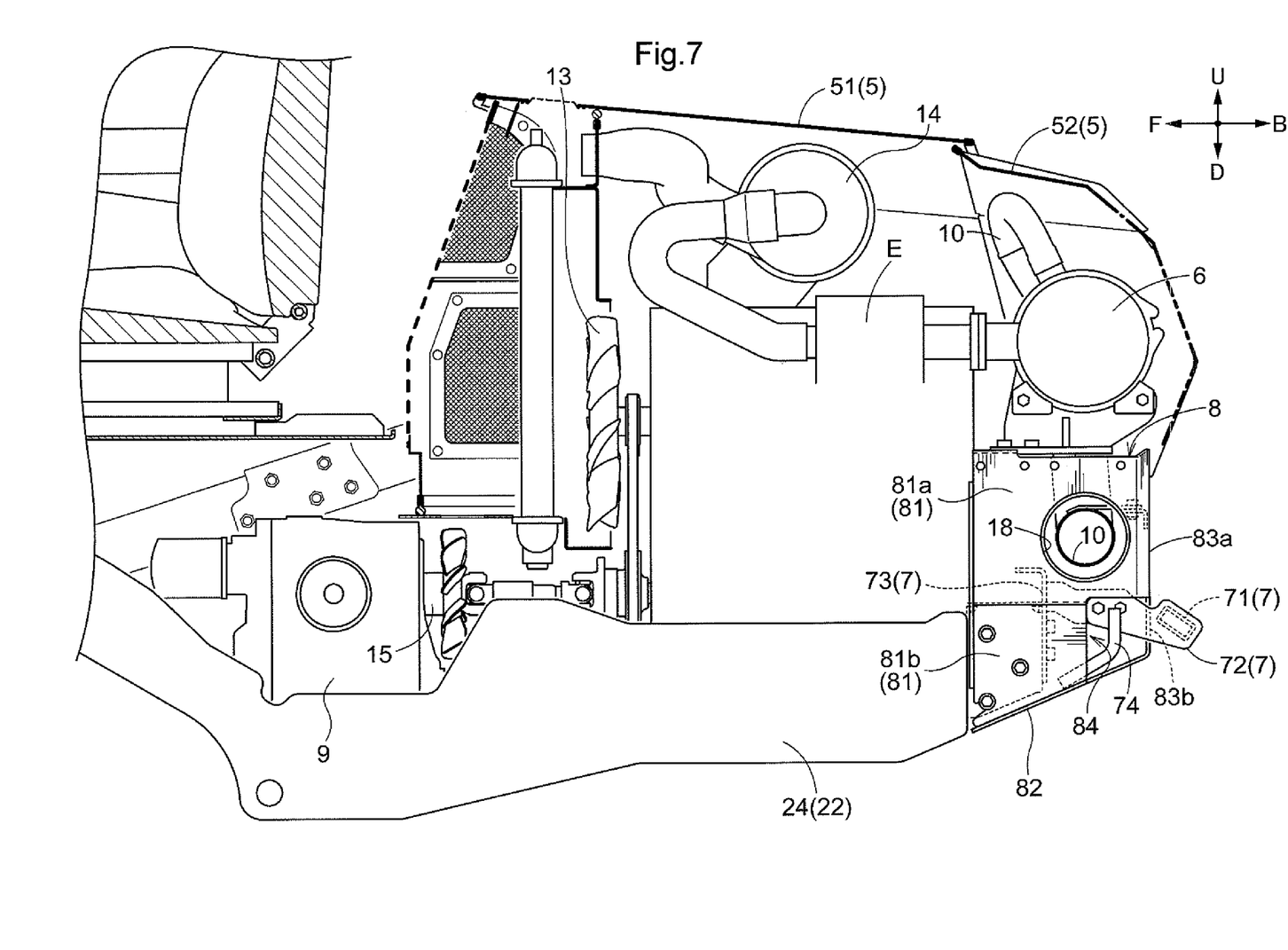
FIG. 7 is a cross-sectional side view of main parts of an embodiment of the present invention, illustrating how the main parts are positioned relative to one another.

As illustrated in FIGS. 1 and 7, the engine E is supported by the second frame 22 with a vibration isolator in-between. The riding-type mower includes a transmission device 9 under the driver section 4 and forward of the engine E. The transmission device 9 includes an input shaft 15 configured to receive motive power from the engine E and a PTO shaft (not shown) configured to transmit motive power to the mower unit 3. The cooling fan 13 is forward of the engine E, and is configured to blow cooling air. The exhaust gas cleaning device 6 is backward of the engine E, and is configured to remove particulate matter from exhaust gas with use of a diesel particulate filter (DPF). The air cleaner 14 is over the engine E.

Hood

As illustrated in FIG. 7, the hood 5 is over the body frame 2 to define an engine room. The hood 5 includes a first hood portion 51 covering the cooling fan 13, the air cleaner 14, and the engine E and a second hood portion 52 covering the exhaust gas cleaning device 6. The hood 5 has a top face inclined with a back portion lowered. The cooling fan 13 blows cooling air, which flows backward along the top face of the first hood portion 51 and then along the back face of the second hood portion 52 to downward of the exhaust gas cleaning device 6.

The second hood portion 52 is fixed to the third frame 8. The first hood portion 51 is movable rotationally about an axis along the left-right direction of the body 1 to be opened and closed. The back face of the second hood portion 52 has a plurality of openings 17 (see FIG. 8) through which to dissipate heat of the exhaust gas cleaning device 6.

Third Frame

Figure 8:
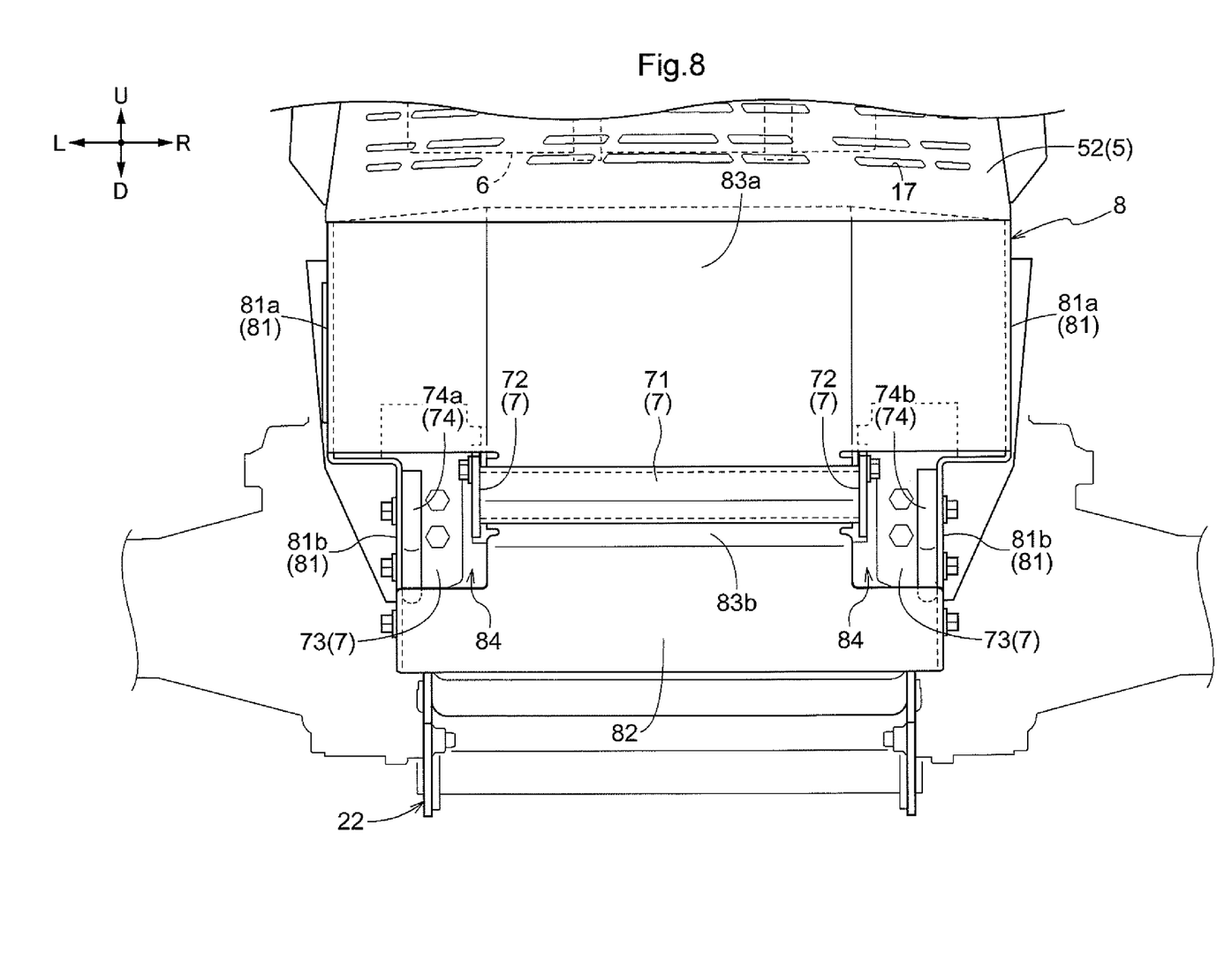
FIG. 8 is a rear view of main parts of an embodiment of the present invention, illustrating how the main parts are positioned relative to one another.

As illustrated in FIGS. 7 and 8, the third frame 8 includes (i) a pair of side face portions 81 each providing a side face, (ii) a bottom face portion 82 inclined with a back portion lifted, and (iii) a back face portion 83 providing a back face. The third frame 8 has an open top, and is covered from above by the second hood portion 52. The third frame 8 has an exhaust port 18, and contains an exhaust duct 10 configured to carry exhaust gas from the exhaust gas cleaning device 6 to the exhaust port 18 to be discharged from the body 1. The third frame 8 for the present embodiment has an exhaust port 18 in a side face portion 81. The exhaust gas cleaning device 6 is over the exhaust port 18.

As illustrated in FIGS. 7 and 8, the third frame 8 is in the form of a single plate-shaped member bent to form a pair of side face portions 81, a bottom face portion 82, and a back face portion 83. The side face portions 81 include respective first side face portions 81a and second side face portions 81b. The first side face portions 81a are positioned above and separated from each other by a large distance in the left-right direction. The second side face portions 81b are positioned below and separated from each other by a small distance in the left-right direction. The second side face portions 81b are formed by bending each of the side face portions 81 into a substantial S shape such that respective lower portions are closer to each other. The back face portion 83 includes a first back face portion 83a and a second back face portion 83b. The first back face portion 83a is wide and positioned above. The second back face portion 83b is narrow and positioned below. The second back face portion 83b has left and right end portions positioned inward of the left and right end portions of the first back face portion 83a in a rear view. The bottom face portion 82 has left and right end portions continuous with respective lower end portions of the second side face portions 81b. The bottom face portion 82 is narrower (that is, smaller in the left-right direction) than the first back face portion 83a by an amount corresponding to the amount by which the second side face portions 81b are bent inward.

The third frame 8 has a pair of openings 84 each extending from the bottom face portion 82 to the back face portion 83. The cooling air from the cooling fan 13 flows through the hood 5 to be discharged through the openings 84 in the third frame 8. Specifically, the cooling air flows through the exhaust gas cleaning device 6 and the exhaust duct 10 to be discharged through the openings 84.

Bumper

As illustrated in FIG. 7, the exhaust gas cleaning device 6 has a back end portion backward of the back end portion of the third frame 8 of the body frame 2. The bumper 7 has (i) a back end portion backward of the back end portion of the exhaust gas cleaning device 6, (ii) an upper end portion below the upper end portion of the third frame 8, and (iii) a lower end portion above the lower end portion of the second frame 22 of the body frame 2. As illustrated in FIG. 8, the bumper 7 has left and right end portions positioned inward of the left and right end portions of the third frame 8 in a rear view. The exhaust gas cleaning device 6 is at a central position of the third frame 8 in a plan view, and extends in the left-right direction of the body 1. The bumper 7 is also at a central position of the third frame 8 in a plan view. In other words, the bumper 7 overlaps with the exhaust gas cleaning device 6 in the front-back direction of the body 1 in a plan view.

As illustrated in FIG. 7, the bumper 7 includes a bar 71 and a pair of left and right supports 72. The bar 71 is an angular pipe extending in the left-right direction. The supports 72 are fixed to the body frame 2, extend backward from the body frame 2, and support the bar 71. The bumper 7 has a top face inclined with a back portion lowered, that is, inclined such that a portion thereof farther backward is farther lower in position. In other words, the bar 71 is supported by the supports 72 such that its top face is inclined to have a lowered back portion, that is, oriented such that a portion of the top face which portion is farther backward is lower in position. The bar 71 has left and right end portions fixed to the respective inner faces of the supports 72.

As illustrated in FIGS. 7 and 8, the supports 72 are detachably fixed to the body frame 2. The supports 72 for the present embodiment are each provided with a base end portion 73. The base end portions 73 are screwed to the auxiliary frame member 25 at a back end portion of the second frame 22, and coupled to the respective supports 72. The supports 72 each extend outward of the third frame 8 from that portion of the corresponding opening 84 which is inward in a rear view. This prevents the bumper 7 from blocking the entire openings 84 in the third frame 8. The supports 72 protrude backward from the body frame 2 by such an amount that the bar 71 has a front end portion in no contact with the third frame 8. In other words, the bar 71 has a front end portion separated from the back end portion of the third frame 8.

Front-Wheel Unit

Figure 9:
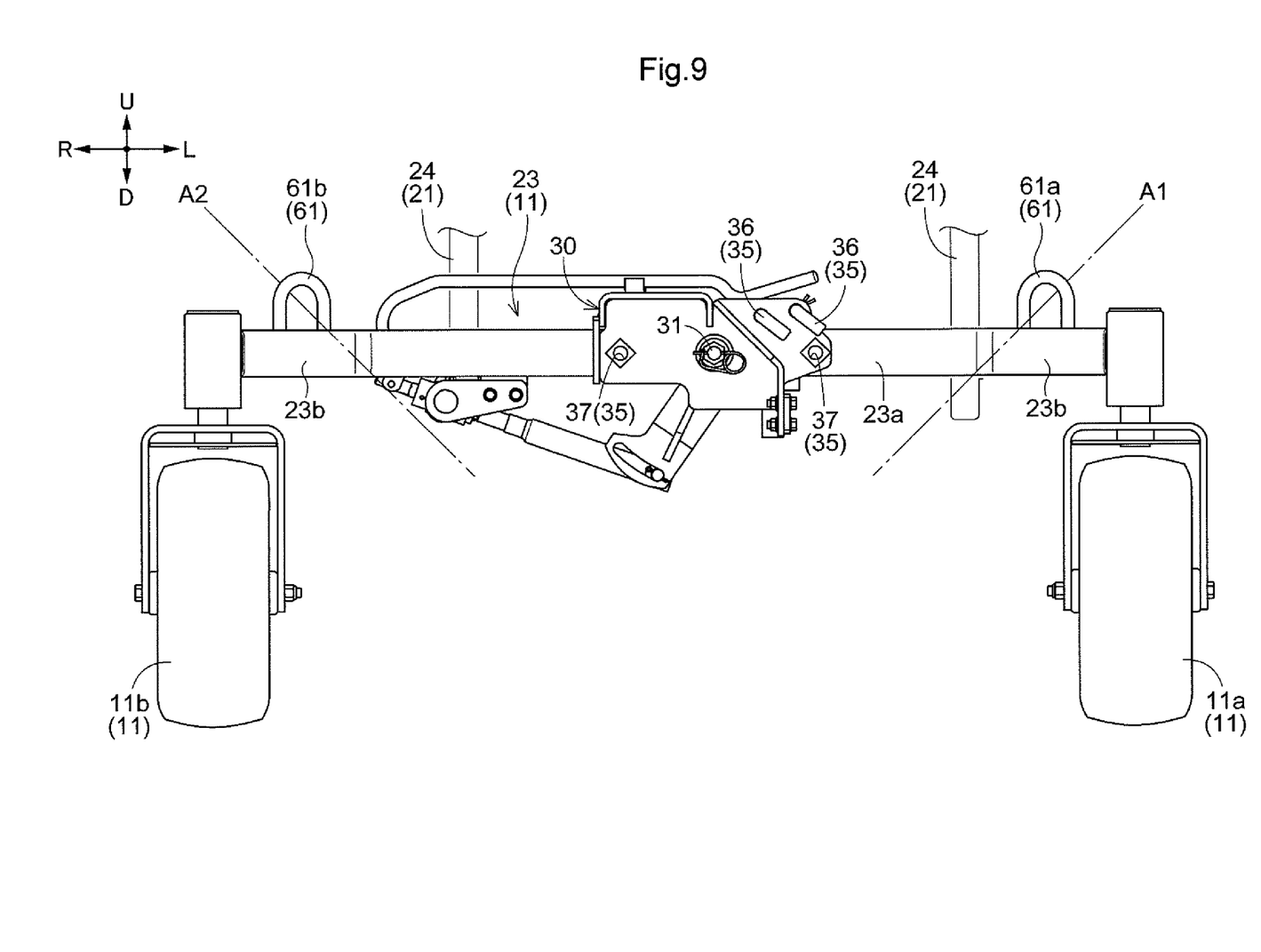
FIG. 9 is a partial front view of a front-wheel unit at a front portion of the body of a riding-type mower.
Figure 10:
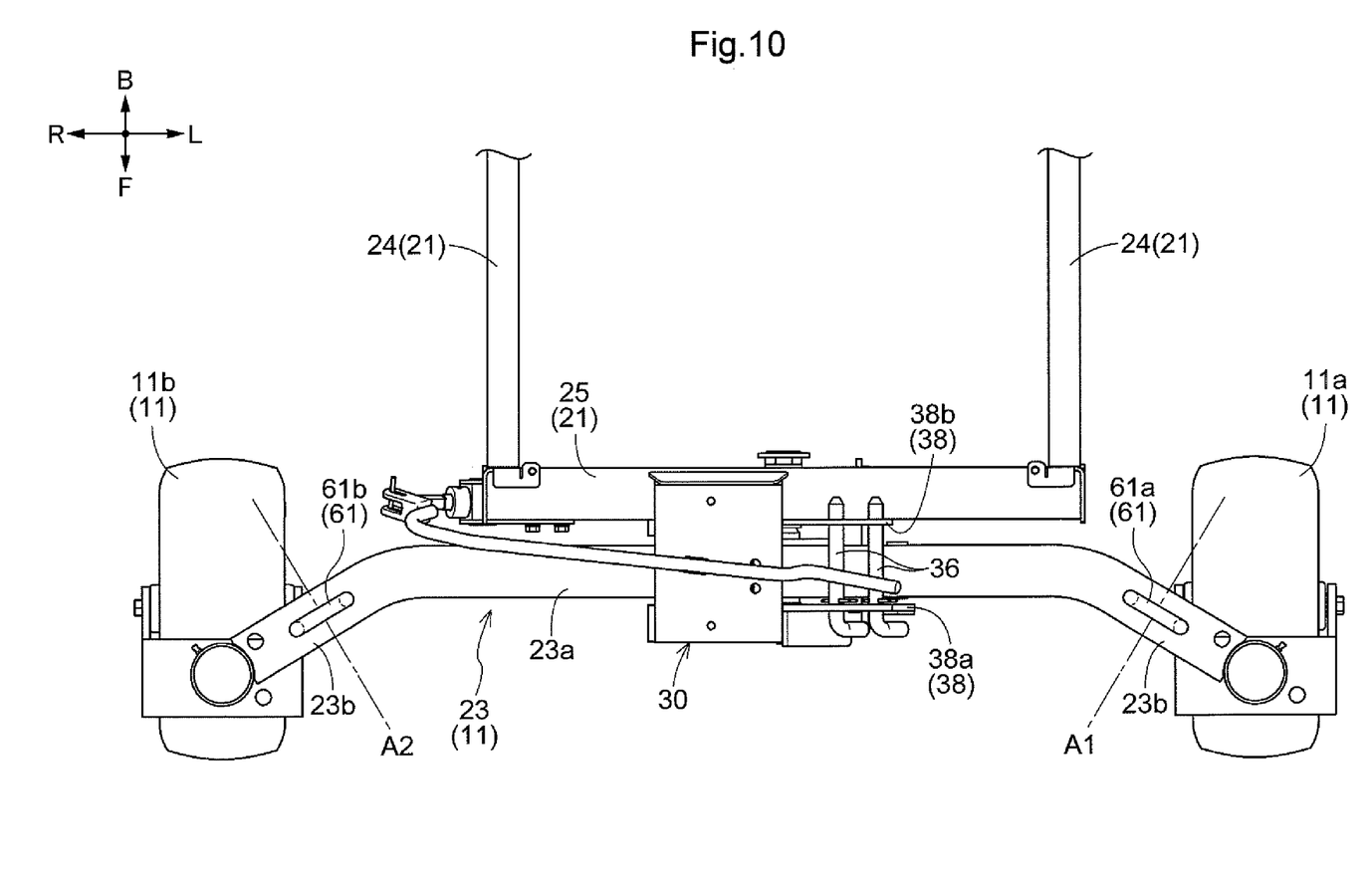
FIG. 10 is a partial plan view of a front-wheel unit at a front portion of the body of a riding-type mower.

As illustrated in FIGS. 9 and 10, the front-wheel unit 11, which is at a front portion of the body 1, includes left and right front wheels 11a and 11b and a support frame 23 supporting the front wheels 11a and 11b.

Figure 2:
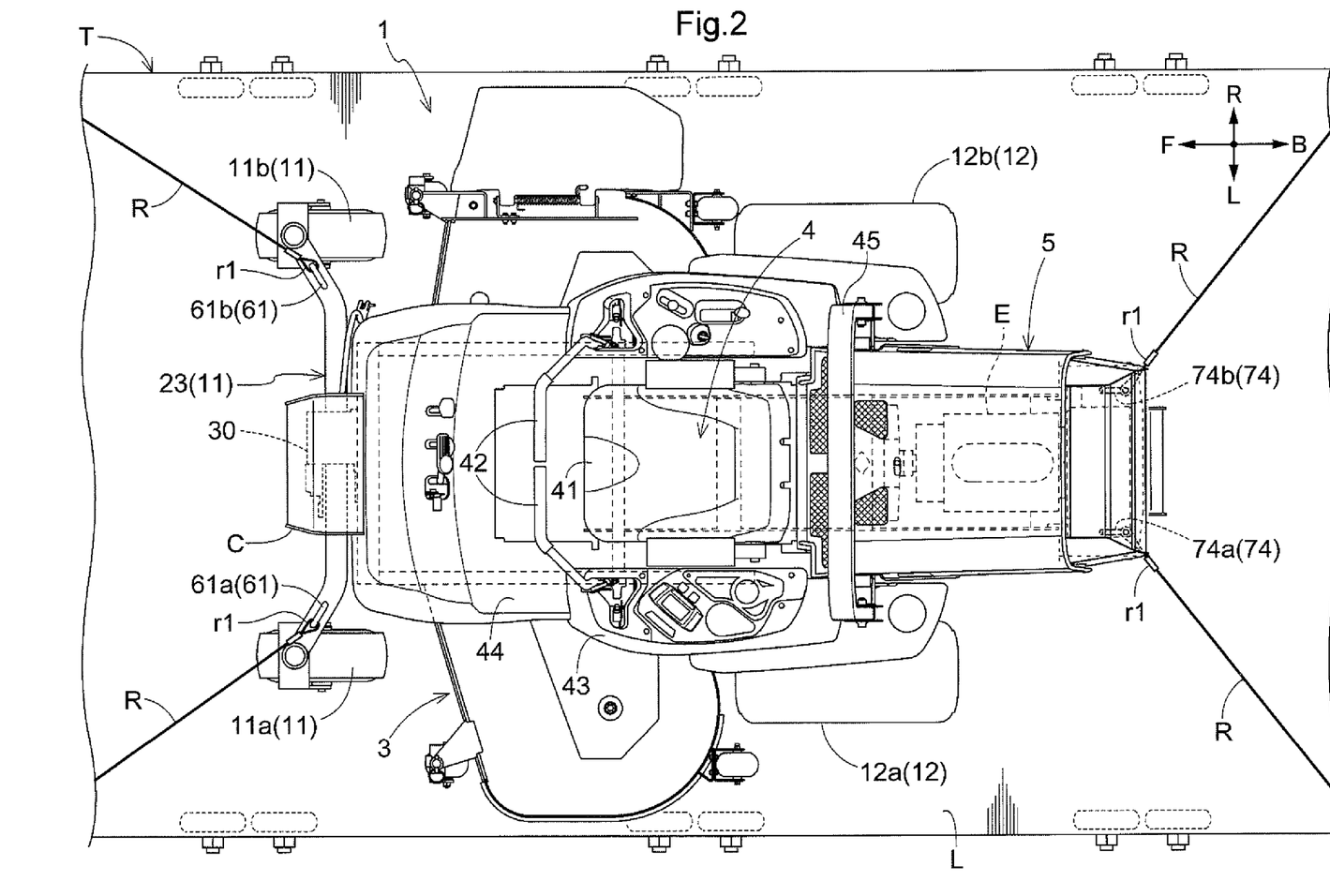
FIG. 2 is a plan view of a riding-type mower as fixed to a trailer.

The front-wheel unit 11 is configured such that the left front wheel 11a and the right front wheel 11b are coupled to each other by means of the support frame 23. The support frame 23 is attached to the body 1 by means of a front-wheel swing unit 30 in such a manner as to be swingable at the center of the body 1 in the left-right direction. The front-wheel swing unit 30 includes a swing shaft 31 disposed at substantially the center of the body 1 in its left-right direction and extending in the front-back direction of the body 1. As illustrated in FIG. 2, the riding-type mower is normally configured such that the front-wheel swing unit 30 is covered by a cover C. The riding-type mower as the present embodiment is configured such that the swing shaft 31 is apart from the right front wheel 11b by a distance larger than the distance by which the swing shaft 31 is apart from the left front wheel 11a. This allows the body 1 to be lifted higher with the right front wheel 11b swung upward and the left front wheel 11a below the right front wheel 11b than otherwise for the same angle of upward swing of the left and right front wheels 11a and 11b about the swing shaft 31.

Lock Mechanism

As illustrated in FIGS. 9 and 10, the riding-type mower includes a lock mechanism 35 configured to restrict swing of the front-wheel unit 11 relative to the body frame 2. The lock mechanism 35, as an example, includes two lock pins 36 and 36, and has two first lock holes 37 and 37 in the front-wheel swing unit 30 and two second lock holes (not illustrated in the drawings) in the support frame 23. The first lock holes 37 and 37 are respectively to the left and right of the swing shaft 31, and extend in the front-back direction of the body 1. The second lock holes correspond in position to the respective first lock holes 37 and 37, and extend in the front-back direction of the body 1. The lock mechanism 35 serves its function with the lock pins 36 and 36 inserted through the respective first lock holes 37 and 37 and other holes. The front-wheel swing unit 30 includes a holder 38 lateral to the swing shaft 31 and configured to receive the lock pins 36 and 36 through itself to hold the lock pins 36 and 36 when the lock pins 36 and 36 are not in use. The holder 38 for the present embodiment includes two holder plates 38a and 38b. The holder plate 38a is configured to receive the respective base ends of the lock pins 36 and 36 to hold the base ends. The holder plate 38b is configured to receive the respective leading ends of the lock pins 36 and 36 to hold the leading ends.

First Holders

Figure 3:
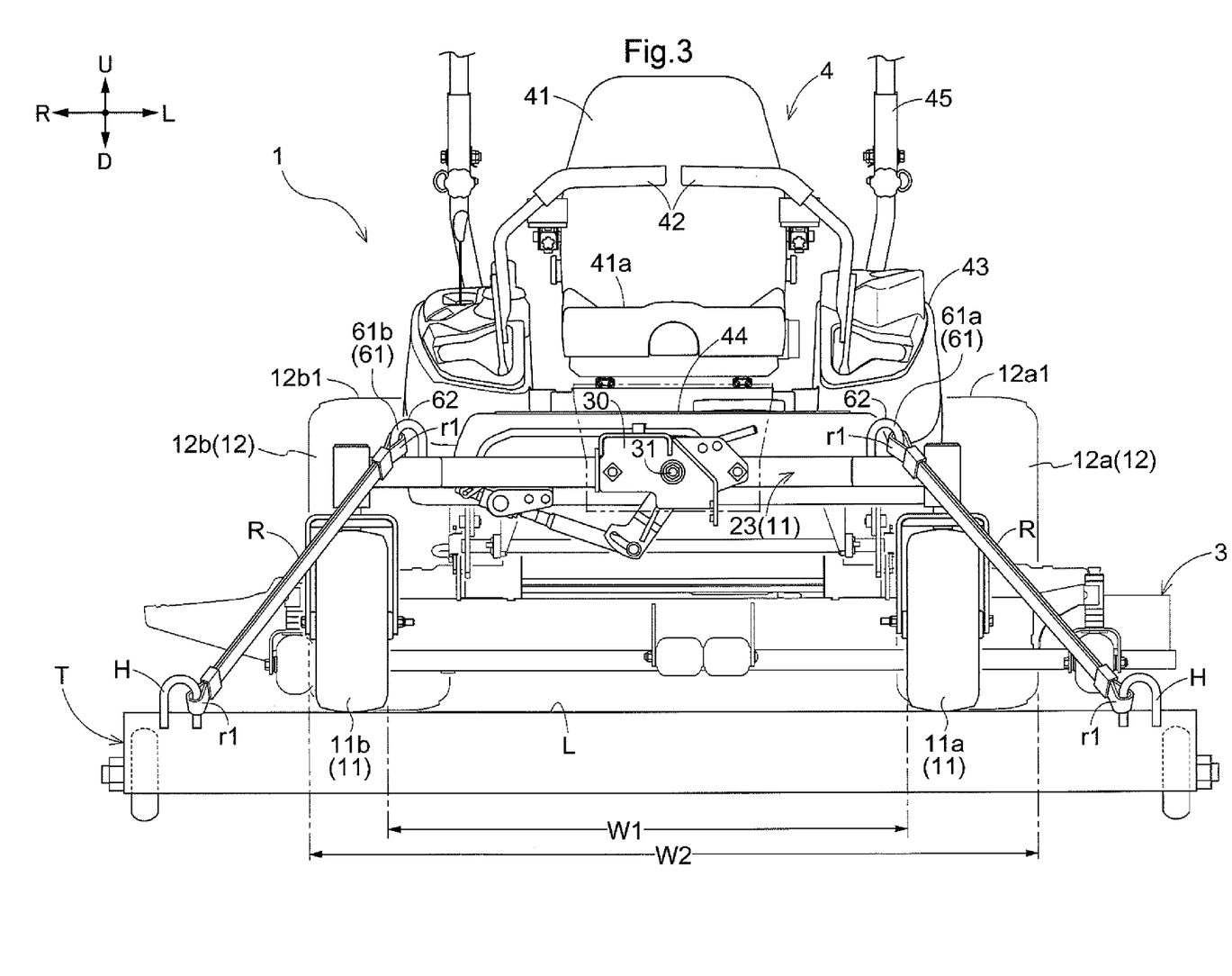
FIG. 3 is a front view of a riding-type mower as fixed to a trailer.

The riding-type mower as the present embodiment is transportable as fixed to, for example, the carrier box of a truck or a trailer. FIGS. 1 to 3 illustrate the riding-type mower as fixed to a trailer T. As illustrated in FIGS. 1 to 3, 9, and 10, the body 1 has a forward portion provided with two first holders 61 each configured to hold a rope R and/or allowing the rope R to pass therethrough. The first holders 61 for the present embodiment are at respective left and right portions of the body 1. Specifically, the first holders 61 are first holders 61a and 61b on the top face of the support frame 23 of the front-wheel unit 11. The support frame 23 includes a linear portion 23a and a pair of extensions 23b and 23b. The linear portion 23a is fixed to the body frame 2. The extensions 23b and 23b extend from the respective opposite ends of the linear portion 23a, and are bent obliquely forward relative to the body 1. The extensions 23b and 23b hold the respective front wheels 11a and 11b. The first holders 61a and 61b are disposed on the extensions 23b and 23b, respectively. The first holders 61a and 61b are each in a U shape. Specifically, the first holders 61a and 61b are each a U-shaped member having opposite ends fixed to the top face of the corresponding one of the extensions 23b and 23b to form a substantial ring as a whole. The first holders 61a and 61b have respective opening axes A1 and A2 angled relative to the front-back direction of the body 1 (see FIGS. 9 and 10).

As illustrated in FIG. 3, the first holders 61a and 61b are to the respective opposite lateral sides of the driver's seat 41 in a front view. The first holders 61a and 61b are within a width W1 in a front view, the width W1 being a dimension extending in the left-right direction of the body 1 and defined by the respective sides of the front wheels 11a and 11b which sides face the center of the body 1. The first holders 61a and 61b are also within a width W2 in a front view, the width W2 being a dimension extending in the left-right direction of the body 1 and defined by the rear wheels 12a and 12b. The first holders 61 are below the seat surface 41a of the driver's seat 41, and have respective upper ends 62 below the respective upper ends 12a1 and 12b1 of the rear wheels 12a and 12b. Further, the first holders 61 are at a height close to that of the step 44 forward of the driver's seat 41 in a front view and, as illustrated in FIG. 1, close to the center of gravity G of the power source.

Second Holders

As illustrated in FIGS. 4, 6, 7, and 8, the body 1 has a backward portion provided with two second holders 74 each configured to hold a rope R. Specifically, the second holders 74 are left and right second holders 74a and 74b forward of and to the respective opposite lateral sides of the bumper 7. The second holders 74a and 74b are each in the shape of a hook extending from a back end portion of the corresponding one of the side face portions 81 backward relative to the body 1. Specifically, the second holders 74a and 74b are each in the shape of a bar that has an end fixed to the corresponding one of the second side face portions 81b and 81b and that has an intermediate portion bent upward relative to the body 1. As illustrated in FIG. 5, the first holders 61 and the second holders 74 are disposed such that a width W3 is larger than a width W4 in a plan view, the width W3 being a dimension extending in the left-right direction of the body 1 and defined by the first holders 61a and 61b, the width W4 being a dimension extending in the left-right direction of the body 1 and defined by the second holders 74a and 74b.

FIGS. 1 to 3 illustrate the riding-type mower as fixed to a trailer T configured to be towed by a truck or the like.

FIGS. 1 to 3 illustrate, for a front portion of the body 1, two ropes R each having a first end hooked on one of the first holders 61 and a second end hooked on a holder H of the trailer T, the ropes R each having at opposite ends two rings r1 one of which is configured to be fastened to the corresponding first holder 61 and the other of which is configured to be fastened to the corresponding holder H, and, for a back portion of the body 1, two more ropes R each having at a first end a ring r1 hooked on one of the second holders 74 and at a second end a ring r1 hooked on a holder H of the trailer T. As illustrated in FIGS. 1 to 3, the first two ropes R are each pulled obliquely in a downward and forward direction relative to the body 1 from the corresponding one of the first holders 61 for connection with a holder H of the trailer T, whereas the second two ropes R are each pulled obliquely in a downward and backward direction relative to the body 1 from the corresponding one of the second holders 74 for connection with a holder H of the trailer T. This prevents the riding-type mower from being moved easily in the vertical or horizontal direction on the trailer T, allowing the riding-type mower to be fixed to the trailer T stably.

FIGS. 1 to 3 illustrate, as an example carrier box or the like for transporting the riding-type mower, a trailer T including only a loading section L for the body 1. Such a carrier box or the like, including a trailer, may alternatively include, in addition to the loading section L, a frame configured to surround the body 1 on its front, back, and lateral sides. Further, the frame may have portions lateral to the body 1 which portions are each provided with a hook for connection with a rope R.

Alternative Embodiments (1) The specific embodiment described above is a riding-type mower. The present invention is, however, applicable to any work machine such as a tractor, a combine, and a harvester.

Figure 11:
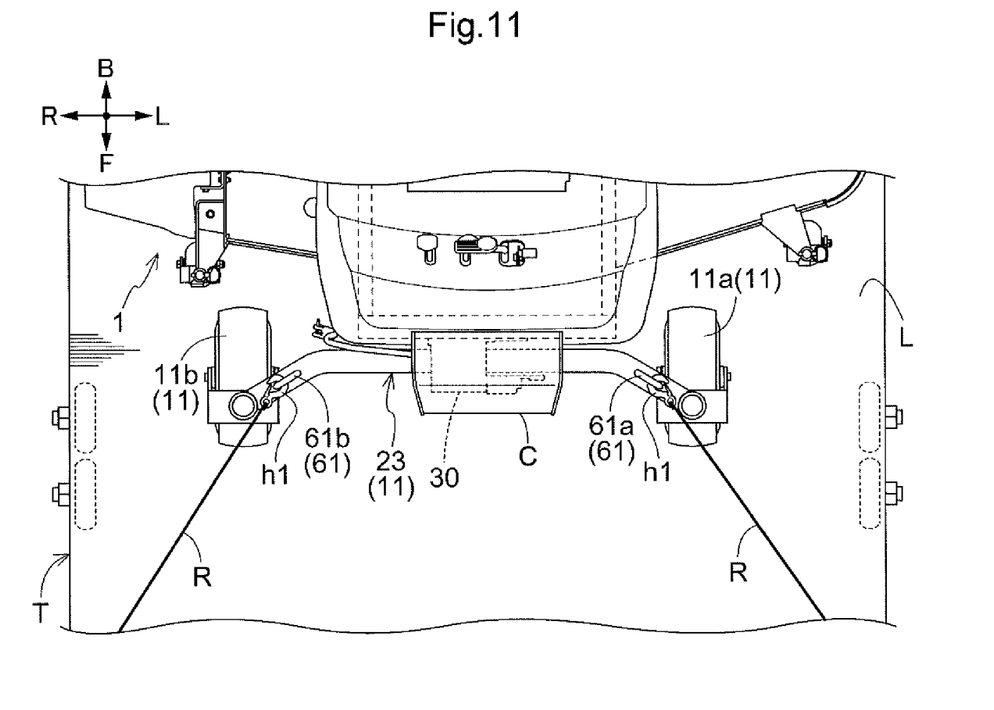
FIG. 11 is a partial plan view of a riding-type mower as fixed to a trailer according to an embodiment of the present invention.
Figure 12:
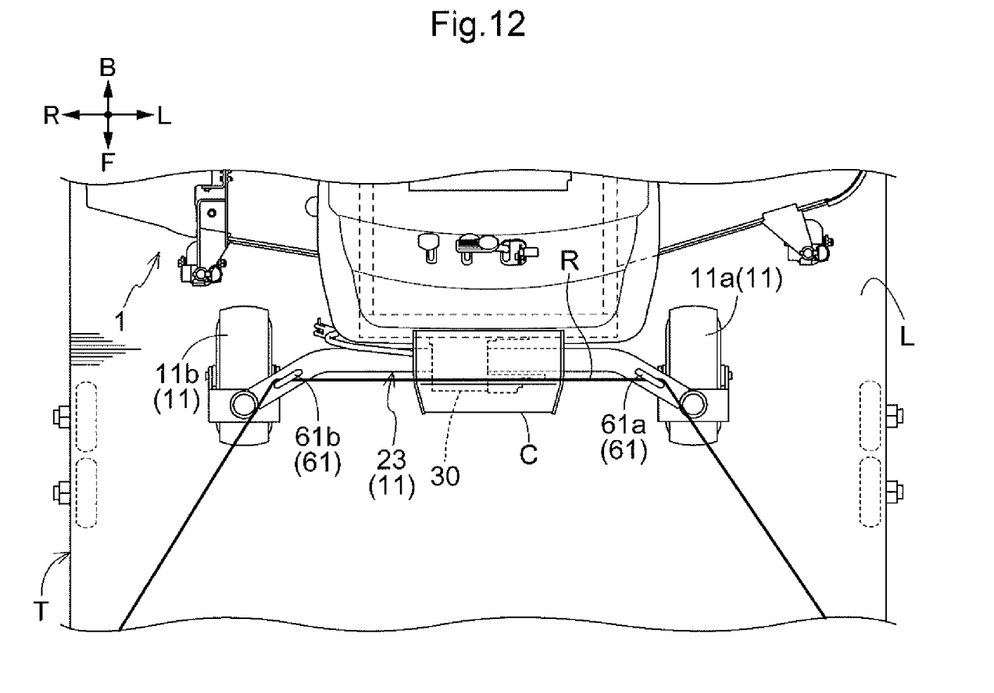
FIG. 12 is a partial plan view of a riding-type mower as fixed to a trailer according to an embodiment of the present invention.
Figure 13:
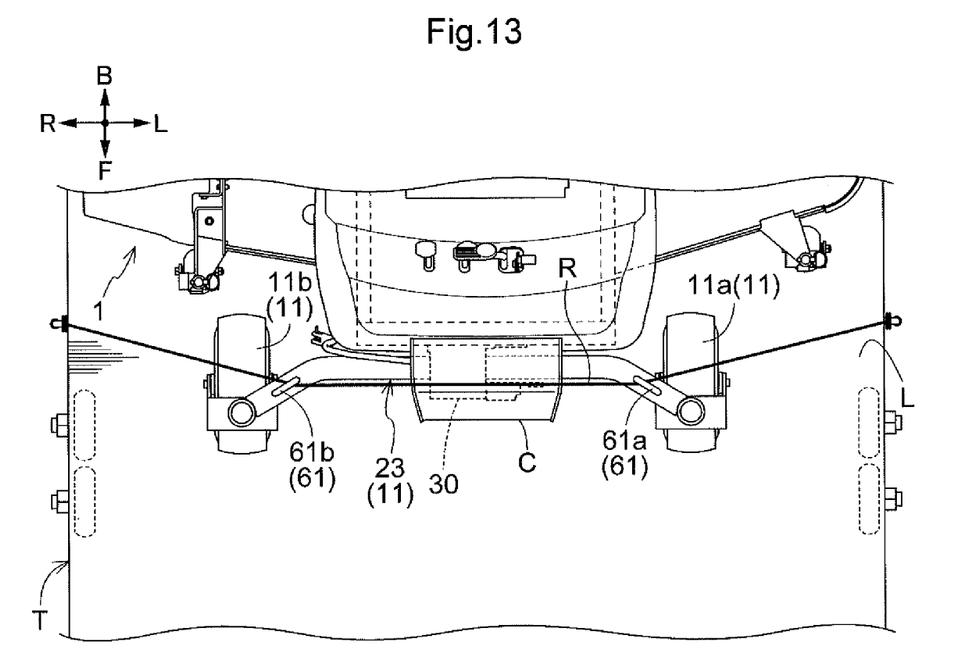
FIG. 13 is a partial plan view of a riding-type mower as fixed to a trailer according to an embodiment of the present invention.

(2) The specific embodiment described above is an example in which rings r1 of ropes R are fastened to first holders 61. The embodiment may be altered as illustrated in FIG. 11 such that ropes R each have an end provided with a separate hook hi connected therewith and that the hook hi is configured to be fastened to a first holder 61. The embodiment may also be altered as illustrated in FIG. 12 or 13 such that a rope R passes through both the left and right first holders 61a and 61b and that the opposite ends of the rope R are connected with the trailer T. FIG. 12 illustrates an example in which a rope R passes through both the left and right first holders 61a and 61b and in which the opposite ends of the rope R are fixed to a front portion of the trailer T. FIG. 13 illustrates an example in which a rope R passes through both the left and right first holders 61a and 61b and in which the opposite ends of the rope R are fixed to respective left and right lateral portions of the trailer T. The rope R may have a ring r1 and a hook hi at each end. The ring and/or the hook may be shaped differently. Although not shown in the drawings, a rope R having a hook hi shown in FIG. 11 may be fastened to each of the second holders 74a and 74b, or a rope R may pass through both the second holders 74a and 74b as with the first holders 61a and 61b shown in FIGS. 12 and 13.

(3) The specific embodiment described above is an example riding-type mower including both first holders 61 and second holders 74. The work machine such as a riding-type mower may include only first holders 61 and not include second holders 74.

(4) The specific embodiment described above is an example including two first holders 61 at respective left and right portions of the body 1 and two second holders 74 at respective left and right portions of the body 1. The embodiment may be altered to include two first holders 61 at respective left and right portions of the body 1 and only one second holder 74, or vice versa. In that case, the single first holder 61 or second holder 74 is preferably close to the center of the body 1 in its left-right direction for the work machine such as a riding-type mower to be supported and fixed in balance.

(5) The embodiment described above is configured such that the first holders 61 are on the support frame 23 of the front-wheel unit 11. The first holders 61 may alternatively be at a front portion of the body 1 other than the support frame 23.

(6) The embodiment described above is an example in which the first holders 61 are each in the form of a U-shaped member. The first holders 61 may alternatively be in another shape such as the shape of a substantial ring with a portion missing to form a hook. Further, the embodiment described above is an example in which the second holders 74 are each in the form of a bar bent into a hook. The second holders 74 may alternatively be in another shape such as a U shape.

(7) The embodiment described above is an example in which the support frame 23 of the front-wheel unit 11 includes a pair of extensions 23b and 23b. The support frame 23 may alternatively include no extensions.

(8) The embodiment described above is an example riding-type mower including a lock mechanism 35 configured to restrict swing of the front-wheel unit 11 relative to the body frame 2. The work machine such as a riding-type mower may alternatively include no such lock mechanism.

The invention claimed is:

1. A work machine, comprising:
a body including:
    a body frame;
    a driver's seat at a central portion of the body;
    a power source at a back portion of the body;
    a front-wheel unit disposed at a front portion of the body and extending in a left-right direction of the body, wherein
the body has a forward portion provided with at least one first holder configured to hold a rope and/or allowing the rope to pass therethrough;
the at least one first holder is at a height close to a center of gravity of the power source; and
the center of gravity of the power source aligns in a horizontal plane with a top of a rear wheel at the back portion of the body.

2. The work machine according to claim 1, wherein the front-wheel unit includes:
    a left front wheel;
    a right front wheel; and
    a support frame supporting the front wheels, wherein
the at least one first holder is on a top face of the support frame.

3. The work machine according to claim 1, wherein the at least one first holder is in a U shape.

4. The work machine according to claim 1, wherein the at least one first holder includes two first holders disposed at respective left and right portions of the body and to respective opposite lateral sides of the driver's seat in a front view.

5. The work machine according to claim 4, further comprising:
    a left front wheel at the front portion of the body; and
    a right front wheel at the front portion of the body, wherein the first holders are within a first width in a front view, the first width being a dimension extending in the left-right direction of the body and defined by respective sides of the front wheels which sides face the center of the body.

6. The work machine according to claim 4, further comprising:

a left rear wheel at the back portion of the body; and a right rear wheel at the back portion of the body, wherein the first holders are within a second width in a front view, the second width being a dimension extending in the left-right direction of the body and defined by the rear wheels.

7. The work machine according to claim 1, wherein the at least one first holder is below a seat surface of the driver's seat.

8. The work machine according to claim 7, further comprising:

a left rear wheel at the back portion of the body; and a right rear wheel at the back portion of the body, wherein the at least one first holder has an upper end below respective upper ends of the rear wheels.

9. The work machine according to claim 7, wherein the at least one first holder is at a height close to a height of a step forward of the driver's seat in a front view.

10. The work machine according to claim 3, wherein the at least one first holder includes two first holders disposed at respective left and right portions of the body and each having an opening axis angled relative to a front-back direction of the body.

11. The work machine according to claim 2, wherein the at least one first holder includes two first holders disposed at respective left and right portions of the body, the support frame includes:

a linear portion fixed to the body frame;

a left extension; and a right extension, the extensions extending from respective opposite ends of the linear portion, bent obliquely forward, and supporting the respective front wheels, and the at least one first holder includes a left first holder on the left extension and a right first holder on the right extension.

12. The work machine according to claim 1, wherein the body has a backward portion provided with at least one second holder configured to hold a rope and/or allowing the rope to pass therethrough.

13. The work machine according to claim 12, further comprising:

a bumper extending backward relative to the body, wherein the at least one second holder includes two second holders disposed at respective left and right portions of the body and forward of and to respective opposite lateral sides of the bumper.

14. The work machine according to claim 13, wherein the at least one first holder includes two first holders disposed at respective left and right portions of the body, and a third width is larger than a fourth width in a plan view, the third width being a dimension extending in the left-right direction of the body and defined by the first holders, the fourth width being a dimension extending in the left-right direction of the body and defined by the second holders.

15. The work machine according to claim 1, further comprising:

a lock mechanism configured to restrict swing of the front-wheel unit relative to the body frame.

\* \* \* \* \*